May 9, 1944.　　　LA MAR S. COOPER　　　2,348,524
FOOD STORAGE RECEPTACLE
Filed Nov. 8, 1941
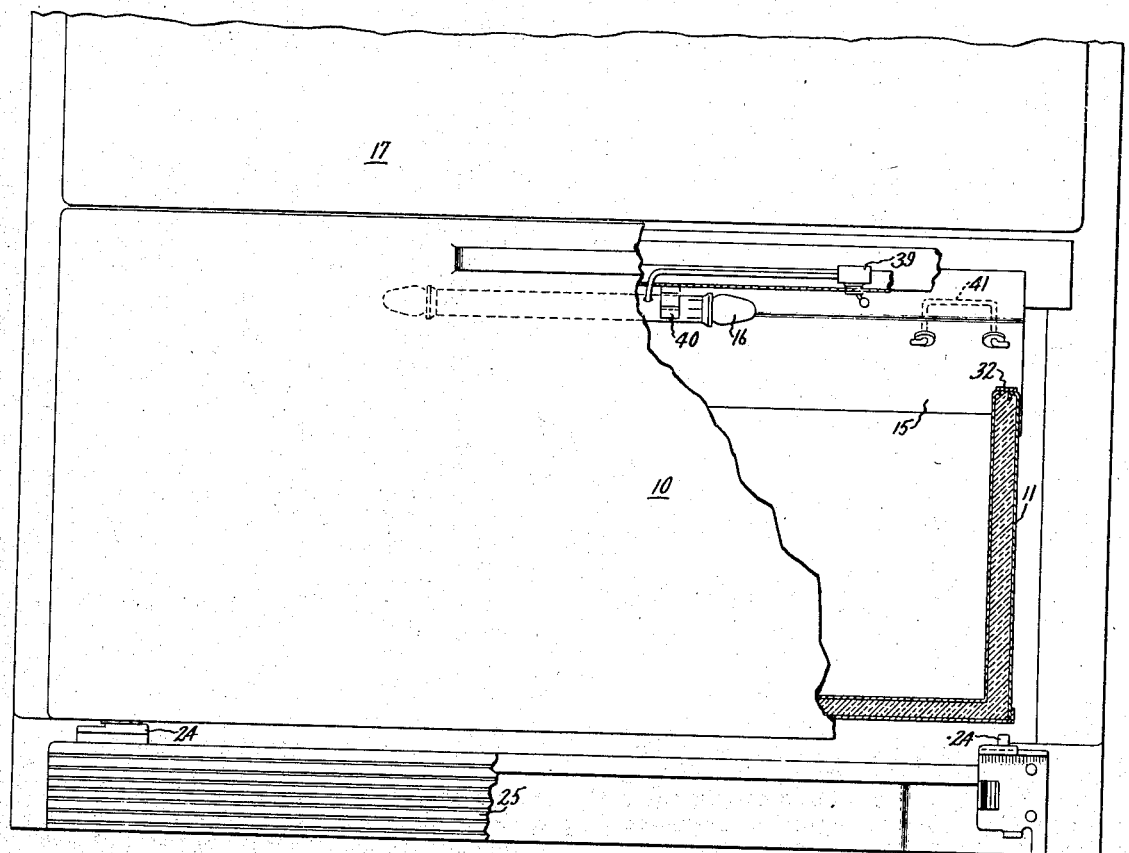
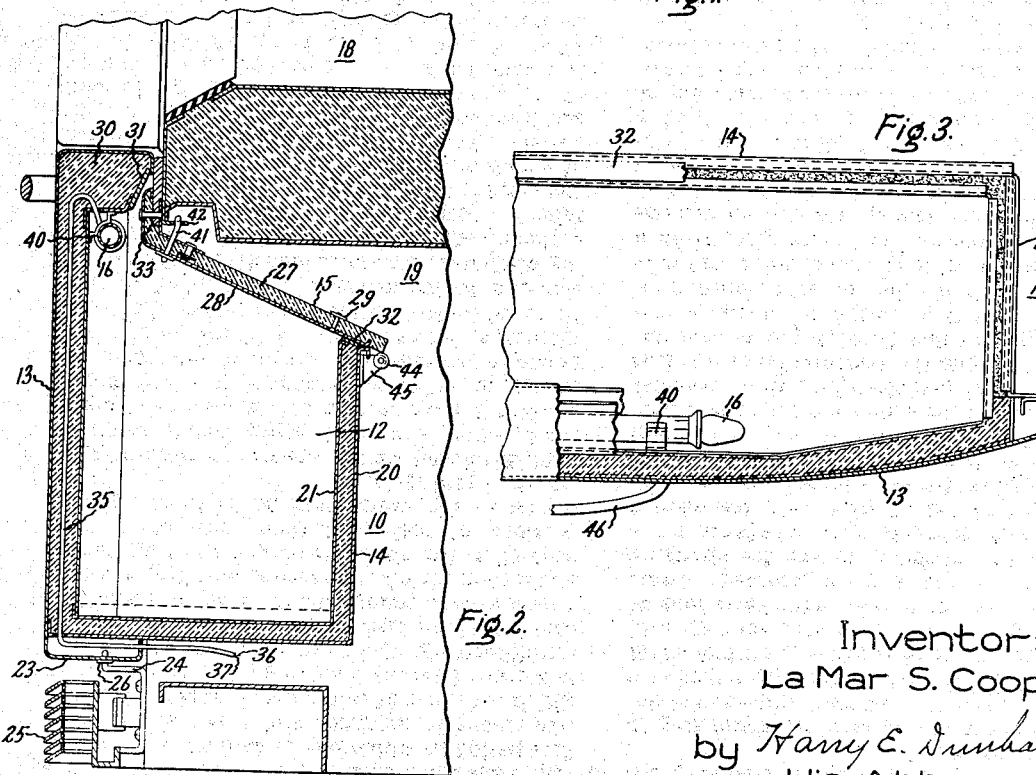
Inventor:
La Mar S. Cooper,
by Harry E. Dunham
His Attorney.

Patented May 9, 1944

2,348,524

UNITED STATES PATENT OFFICE 2,348,524

FOOD STORAGE RECEPTACLE

La Mar S. Cooper, Erie, Pa., assignor to General Electric Company, a corporation of New York Application November 8, 1941, Serial No. 418,395

2 Claims. (Cl. 34—90)

This invention relates to food storage receptacles and more particularly to receptacles for the preservation of foods, such as crackers, cereals and the like. Such articles are normally sold in containers which are rendered substantially moisture-proof in order to keep the articles contained therein fresh and crisp. After the containers have been opened and the moisture-proof seal destroyed thereby, the article, such as crackers, comparatively rapidly absorbs moisture from the air and loses its crispness and becomes stale.

It is an object of my invention to provide new and improved means for maintaining such articles in a crisp and fresh state.

Other objects and advantages of my invention will become apparent as the following description proceeds, and the features of novelty which characterize my invention will be pointed out with particularity in the claims annexed to and forming a part of this specification.

For a better understanding of my invention reference may be had to the accompanying drawing in which Fig. 1 is a front elevational view, partly in section, of a portion of a refrigerator cabinet; Fig. 2 is a vertical section of the food storage cabinet disclosed in Fig. 1, and Fig. 3 is a partial horizontal section of the receptacle shown in Fig. 2.

In connection with my invention, I have illustrated a food storage receptacle 10 designed for the maintenance of crackers, cereals and the like in a relatively fresh and crisp state for indefinite periods. The receptacle 10 is provided with side walls 11 and 12, front wall 13, rear wall 14, and a cover member 15. In order to maintain a relatively low humidity within the receptacle 10 and thereby minimize the amount of water vapor available for absorption by the stored articles, there is provided a source of heat such as one or more electric lamps 16.

I have illustrated my invention as being contained in the lower portion of a refrigerator cabinet 17. Conventional cabinets for domestic mechanical refrigerators have a food storage compartment 18 in the upper portion thereof and a machinery compartment 19 in the lower portion thereof. If the refrigerating equipment normally disposed in the latter compartment is placed in the rear portion of that space, there is provided at the front of the machinery compartment a space which may be utilized for bulk storage. I have disposed the dehydrator compartment 10 in this space.

The walls and cover of the receptacle are preferably heat insulating in order to maintain the interior of the receptacle at the relatively high temperature by the application of as little heat as possible in order to maintain high economy of operation.

I have illustrated walls formed from spaced-apart metal members 20 and 21 with any suitable insulating material disposed therebetween. It will be obvious that other forms of construction may be employed and therefore the details of the wall construction will not be further elaborated.

The receptacle may be maintained in position by any desired means. In the illustrated form of my invention, the bottom wall of the receptacle is provided adjacent the front edge thereof with a depending metal shell or housing 23 which may be an extended portion of the outer front wall of the receptacle. The portion 23 is provided with suitable openings on the under side thereof through which may be extended supporting brackets 24 which may be suitably carried by the cabinet. In the form of my invention illustrated herein the brackets 24 serve not only to support the receptacle but also to provide a support for a decorative grille 25. In order properly to locate the receptacle in a vertical direction, the upstanding end portion of the bracket 24 may be provided with a shoulder 26 or other suitable means. By making the opening through which the portion 24 extends relatively large with respect to the cross section of the bracket portion 24, the drawer may be tilted forwardly sufficiently to permit access thereto through the open top. Other forms of support may be provided, if desired. For example, the receptacle 10 may be disposed for sliding movement with respect to the refrigerator cabinet instead of the pivotal arrangement therein described.

With the above-described arrangement no locking means is provided inasmuch as the center of gravity of the receptacle whether empty or filled is well to the rear of the pivot point at the portion 24. The cover member 15 for the receptacle, in the illustrated form of my invention comprises a sheet of insulating material 27 and a metal sheet member 28 secured to the under side thereof as by rivets 29 or other suitable fastening means.

As best seen in Fig. 2, the front wall of the receptacle is provided at the top edge thereof with a rearwardly extending portion 30 and the wall members 20 and 21 are maintained in spaced-apart relationship by means of suitable breaker strips 31 and 32 in order to minimize the conduction of heat between the metal liners or shells. In order to seal the space between the end of the lateral portion 30 and the front of the cabinet portion 32 I have provided the cover 15 with an upwardly extending portion 33.

There is provided a source of heat for maintaining the interior of the receptacle at a relatively high temperature as hereinbefore explained. I prefer to employ a source of radiant heat as by using one or more electric lamps 16 although I may employ a resistor element clamped to one of the walls of the receptacle on either the inner or outer side thereof, or any other suitable heating means. However, I have found that the use of a source of radiant heat causes a greater percentage of the total heat to reach the stored article. The reason for this is that there is less chance of heat leakage through the container insulation by conduction than if, for example, a resistor element is clamped to the inner liner 21.

I have found that if the inner portions or at least substantial portions of the inner lining 21 are provided with a surface having a relatively high coefficient of emission or reflection of radiant heat or, in other words, having a relatively low coefficient of absorption of radiant heat, transfer of heat to the stored food is still further enhanced. A surface embodying these characteristics may be provided, for example, by utilizing aluminum having a bright or polished surface exposed to the source of heat. I have found that if such a material is used for the inner lining, a heat source of approximately 5 watts capacity is ample for maintaining fresh and crisp articles stored in the receptacle of approximately the shape illustrated and having a volume of approximately one cubic foot and that the provision of approximately 10 watts capacity is ample for drying out or removing moisture from the foods stored in such a container.

Inasmuch as the electric circuit for the lamp or lamps forms no part of my present invention, it has been deemed sufficient to illustrate merely a cable 35 containing a pair of wires 36 and 37 for connection to a suitable source of electrical power. I have illustrated the use of a switch 39 so that the user of the device may control the source of heat as desired.

The source of heat may be supported in any desired fashion as by means of one or more clips 40 suitably secured, as to an inner wall of the receptacle.

I have found it desirable to maintain the cover 15 in engagement with the rear wall 14 of the storage compartment throughout the pivotal movement thereof. Therefore, I have pivotally supported the cover near the front edge thereof as by means of a pair of substantially U-shaped hinge members 41 attached at the ends thereof in any suitable manner to the cover and being held by suitable bracket members 42 secured to the refrigerator cabinet in any suitable manner. Other suitable hinge means may be substituted if desired.

Inspection of Fig. 2 will show that as the receptacle is moved forwardly in a counter-clockwise direction about the pivot point, the marginal edge of the rear wall will move along an arc in a counter-clockwise direction causing the cover 15 to be lifted slightly and then lowered but remaining in engagement with the top marginal edge of the rear wall. In order to minimize friction there may be provided a roller 44 suitably carried from the receptacle as by means of a bracket 45.

In order to facilitate movement of the receptacle from one position to another, there may be provided a suitable handle 46 supported by the receptacle in any convenient manner.

Modifications will occur to those skilled in the art. For example, instead of employing a manually operated switch 39, an automatic control operative according to the relative humidity of the air within the receptacle may be employed, if desired.

While I have shown a particular embodiment of my invention, I do not desire my invention to be limited to the particular construction shown and described and I intend in the appended claims to cover all modifications within the spirit and scope of my invention.

What I claim as new and desire to secure by Letters Patent of the United States, is:

1. In a refrigerator cabinet of the type having a refrigerated food storage compartment, a machinery compartment below said storage compartment and disposed toward the rear of said cabinet, and a movable food storage receptacle located in the front portion of said cabinet below said storage compartment, said receptacle having thermally insulated walls, one of said walls having an opening therein, a thermally insulated cover hinged on said cabinet for closing said opening whereby the transmission of heat and moisture into and out of said receptacle is minimized, said cover being arranged to remain in frictional engagement with said receptacle throughout the movement of said receptacle, and means for maintaining a relatively low relative humidity within said receptacle and for dehydrating foods stored therein, said means comprising a source of radiant heat disposed in the upper portion of said receptacle in such a manner that a minimum of storage space is occupied thereby, substantial portions of the inner sides of said walls being provided with surfaces having a relatively high coefficient of reflection of radiant heat.

2. In a refrigerator cabinet of the type having a refrigerated food storage compartment, an access opening in the front wall of said compartment and closure means for closing said access opening, a machinery compartment below said storage compartment and disposed toward the rear of said cabinet, and a movable food storage receptacle located in the front portion of said cabinet below said storage compartment, said receptacle having thermally insulated walls, said receptacle being so disposed and dimensioned that the front wall thereof is substantially flush with the front surface of said closure means for said access opening, the upper wall of said receptacle having an opening in the rearward portion, and a thermally insulated closure means for closing said opening whereby the transmission of heat and moisture into and out of said receptacle is minimized, means for maintaining a relatively low relative humidity within said receptacle and for dehydrating foods stored therein, said means comprising a source of radiant heat disposed adjacent the front wall of said receptacle and immediately below the front portion of said upper wall whereby a minimum of storage space is occupied thereby and said source of heat is substantially protected from being struck during the insertion or withdrawal of articles into or from said receptacle, substantial portions of the inner sides of said walls being provided with surfaces having a relatively high coefficient of reflection of radiant heat.

LA MAR S. COOPER.